(12) United States Patent
Tan

(10) Patent No.: US 8,772,375 B2
(45) Date of Patent: Jul. 8, 2014

(54) COMPOSITION OF POLYACRYLATE, EPOXY AND POLYAMINE

(76) Inventor: Ling Tan, Raleigh, NC (US)

(*) Notice: Subject to any disclaimer, the term of this patent is extended or adjusted under 35 U.S.C. 154(b) by 409 days.

(21) Appl. No.: 12/932,149

(22) Filed: Feb. 19, 2011

(65) Prior Publication Data

US 2012/0214908 A1    Aug. 23, 2012

(51) Int. Cl.
| | |
|---|---|
| *C08G 59/58* | (2006.01) |
| *C08G 59/42* | (2006.01) |
| *C08L 63/00* | (2006.01) |
| *C09D 163/00* | (2006.01) |
| *C08K 5/05* | (2006.01) |
| *C08K 5/13* | (2006.01) |
| *C08K 5/06* | (2006.01) |
| *C08F 8/00* | (2006.01) |
| *C08G 59/50* | (2006.01) |

(52) U.S. Cl.
CPC ............... *C08F 8/00* (2013.01); *C09D 163/00* (2013.01); *C08K 5/05* (2013.01); *C08L 63/00* (2013.01); *C08K 5/13* (2013.01); *C08K 5/06* (2013.01); *C08G 59/502* (2013.01)
USPC .......................................... 523/400; 525/421

(58) Field of Classification Search
CPC .......................... C08G 59/4284; C08G 59/58
USPC ............................................................ 525/421
See application file for complete search history.

(56) References Cited

U.S. PATENT DOCUMENTS

| | | | | |
|---|---|---|---|---|
| 4,921,912 | A * | 5/1990 | Sagawa et al. | 525/112 |
| 4,975,471 | A * | 12/1990 | Hayase et al. | 522/13 |
| 6,437,059 | B1 * | 8/2002 | Tan et al. | 525/528 |
| 6,485,787 | B2 * | 11/2002 | Tan et al. | 427/386 |
| 2004/0006152 | A1 * | 1/2004 | Weikard et al. | 522/162 |
| 2008/0207793 | A1 * | 8/2008 | Heischkel et al. | 522/90 |
| 2009/0053530 | A1 * | 2/2009 | Sommer et al. | 428/425.1 |
| 2009/0205537 | A1 * | 8/2009 | Ambrose et al. | 106/287.11 |
| 2010/0210757 | A1 * | 8/2010 | Sommer et al. | 523/402 |

FOREIGN PATENT DOCUMENTS

JP          07-01165 A    *    1/1995

OTHER PUBLICATIONS

EPIKOTE Resin 1004 Datasheet, issued Sep. 2002, pp. 1-2.*

* cited by examiner

*Primary Examiner* — Randy Gulakaowski
*Assistant Examiner* — Ha Nguyen

(57) ABSTRACT

A composition suitable for forming a paint marking on a roadway comprises a polyfunctional acrylate having at least four acrylate groups, an epoxy component and a polyfunctional amine. The polyfunctional acrylate reacts with the polyfunctional amine to form an adduct with secondary amine groups. The secondary amine reacts with the epoxy component to yield a chemically high crosslinked material having a no track time of less than about five minutes.

11 Claims, 1 Drawing Sheet

Primary amine    Polyacrylate        Secondary amine

Secondary amine    Epoxy    Tertiary amine illustrate a reaction scheme in accordance with the method of the invention

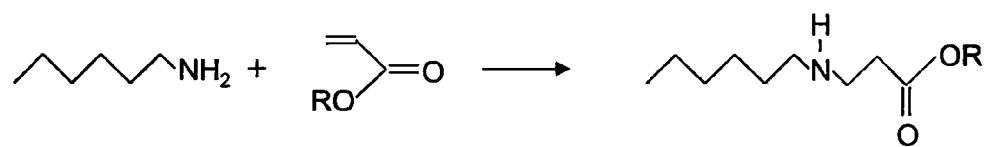
Primary amine        Polyacrylate                    Secondary amine
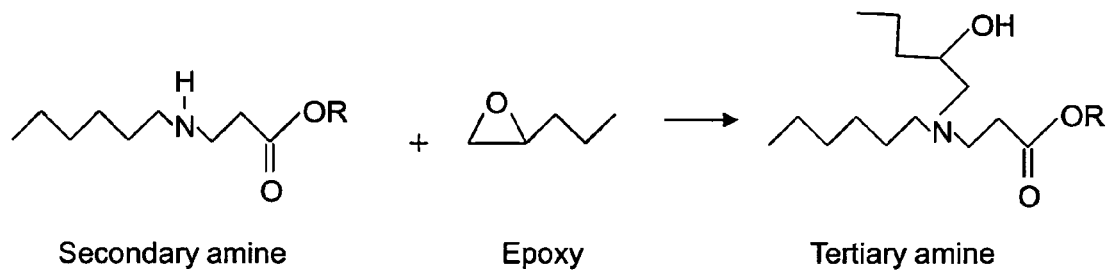
Secondary amine          Epoxy                    Tertiary amine
illustrate a reaction scheme in accordance with the method of the invention

COMPOSITION OF POLYACRYLATE, EPOXY AND POLYAMINE

REFERENCES CITED

Referenced by

U.S. Patent Documents

U.S. Pat. No. 3,326,098 June 1967 Boettler
U.S. Pat. No. 3,897,378 July 1975 Scohy et al.
U.S. Pat. No. 3,904,795 September 1975 Mercurio
U.S. Pat. No. 3,914,463 October 1975 Mercurio et al.
U.S. Pat. No. 4,023,977 May 1977 Mercurio et al.
U.S. Pat. No. 4,051,195 September 1977 McWhorter
U.S. Pat. No. 4,058,641 November 1977 Hnojewyj
U.S. Pat. No. 4,060,425 November 1977 Harada et al.
U.S. Pat. No. 4,076,671 February 1978 Bright
U.S. Pat. No. 4,088,633 May 1978 Gurney
U.S. Pat. No. 4,105,808 August 1978 McKenzie
U.S. Pat. No. 4,135,009 January 1979 Mercurio
U.S. Pat. No. 4,173,682 November 1979 Noomen et al.
U.S. Pat. No. 4,185,132 January 1980 Gurney
U.S. Pat. No. 4,197,225 April 1980 Emmons et al.
U.S. Pat. No. 4,255,468 March 1981 Olson
U.S. Pat. No. 4,263,372 April 1981 Emmons et al.
U.S. Pat. No. 4,289,678 September 1981 Calder et al.
U.S. Pat. No. 4,303,565 December 1981 Tobias
U.S. Pat. No. 4,303,581 December 1981 Levine et al.
U.S. Pat. No. 4,330,444 May 1982 Pollman
U.S. Pat. No. 4,400,413 August 1983 Emmons et al.
U.S. Pat. No. 4,436,845 March 1984 Kitano
U.S. Pat. No. 4,460,625 July 1984 Emmons et al.
U.S. Pat. No. 4,522,961 June 1985 Martino et al.
U.S. Pat. No. 4,598,111 July 1986 Wright et al.
U.S. Pat. No. 4,619,952 October 1986 Hart et al.
U.S. Pat. No. 4,661,540 April 1987 Le et al.
U.S. Pat. No. 4,740,536 April 1988 Chao
U.S. Pat. No. 4,835,241 May 1989 Waddill
U.S. Pat. No. 4,836,878 June 1989 Irving et al.
U.S. Pat. No. 4,886,845 December 1989 Becker et al.
U.S. Pat. No. 4,897,434 January 1990 Shimada et al.
U.S. Pat. No. 4,906,716 March 1990 Yang et al.
U.S. Pat. No. 5,077,117 December 1991 Harper et al.
U.S. Pat. No. 5,106,945 April 1992 Hare
U.S. Pat. No. 5,126,170 June 1992 Zwiener et al.
U.S. Pat. No. 5,151,454 September 1992 Goto et al.
U.S. Pat. No. 5,166,272 November 1992 Burks et al.
U.S. Pat. No. 5,236,974 August 1993 Dreischhoff et al.
U.S. Pat. No. 5,243,012 September 1993 Wicks et al.
U.S. Pat. No. 5,264,468 November 1993 Miyahara
RE34,766 October 1994 Merz et al.
U.S. Pat. No. 5,385,684 January 1995 Gutierrez et al.
U.S. Pat. No. 5,426,157 June 1995 Starner et al.
U.S. Pat. No. 5,442,034 August 1995 Primeaux, II
U.S. Pat. No. 5,472,737 December 1995 Anders
U.S. Pat. No. 5,478,596 December 1995 Gurney
U.S. Pat. No. 5,480,955 January 1996 Primeaux, II
U.S. Pat. No. 5,527,853 June 1996 Landy et al.
U.S. Pat. No. 5,536,775 July 1996 Curatolo et al.
U.S. Pat. No. 5,554,671 September 1996 Craun et al.
U.S. Pat. No. 5,605,953 February 1997 Esser
U.S. Pat. No. 5,609,965 March 1997 Esser
U.S. Pat. No. 5,616,677 April 1997 Primeaux, II et al.
U.S. Pat. No. 5,665,793 September 1997 Anders
U.S. Pat. No. 5,677,379 October 1997 Becker et al.
U.S. Pat. No. 5,709,908 January 1998 Gurney
U.S. Pat. No. 5,770,674 June 1998 Cageao et al.
U.S. Pat. No. 5,853,615 December 1998 Suhr
U.S. Pat. No. 5,874,491 February 1999 Anders
U.S. Pat. No. 5,939,514 August 1999 Brown et al.
U.S. Pat. No. 5,962,148 October 1999 Nishimura et al.
U.S. Pat. No. 6,005,062 December 1999 Hansen et al.
U.S. Pat. No. 6,015,871 January 2000 Jamasbi et al.
U.S. Pat. No. 6,027,764 February 2000 Gurney
U.S. Pat. No. 6,057,415 May 2000 Roesler et al.
U.S. Pat. No. 6,013,755 June 2000 Primeaux, H et al.
U.S. Pat. No. 6,166,106 December 2000 Purgett et al.
U.S. Pat. No. 6,437,059 Aug. 20, 2002 Tan, et al.
U.S. Pat. No. 6,485,787 Nov. 26, 2002 Tan, et al.

Foreign Patent Documents 63-118388 May, 1988 JP
4-149444 May, 1992 JP
7-242798 September, 1995 JP

OTHER REFERENCES

Acrylate-Modified, Two-Part Epoxies for Coatings Applications, Paint and Coatings Industry, August 1996.
Wicks et al.; Amine chemistries for isocyanate-based coatings, Progress in Organic Coatings, 30 (1997) 265-270.
Lee et al.; Aldimine-Isocyanate Chemistry: A Foundation for High Solids Coatings, Waterborne, Higher-Solids, and Powder Coatings Symposium, Feb. 22-24, 1995, pp. 69-77.
Wicks et al.; Control of the Reaction Between Polyaspartic Esters and Aliphatic Polyisocyanates, Waterborne Higher-Solids, and Powder Coating Symposium, Feb. 24-26, 1993, pp. 49-56.
Noomen, Arie; Applications of Michael Addition Chemistry in Coatings Technology, Progress in Organic Coatings, 32 (1997) 137-142.
Primeaux II, D. J., 100% Solids Aliphatic Spray Polyurea Elastomer Systems, Polyurethanes World Congress 1991, Sep. 24-26, 1991, pp. 473-477.
Abstract (Wicks&Yeske), Control of the Reaction Between Polyaspartic Esters and Aliphatic Polyisocyanates, Feb. 24-26, 1993, pp. 49-56.
Brochure, Texaco Chemical Company, Potential Uses for Polyurea Spray Elastomers, 1990.
Brochure, Texaco Chemical Company, Polyurea Spray Technology Information, 1989, pp. 1-5.
Http://stnessy.cas.org/tmp/282588-0319287490-200/711682533.html, Abstract, Ochi et al., Jpn. KokaiTokkyoKoho, 13 pp., Apr. 22, 2001.
Http://stnessy.cas.org/tmp/282588-0319287490-200/736074878.html, Abstract, Harper, Eur. Pat. Appl., 13 pp., Apr. 22, 2001.

FIELD OF THE INVENTION

The invention relates to polymeric compositions that may be used in paint and adhesive applications.

BACKGROUND OF THE INVENTION

There has been recent activity surrounding the development of polymeric compositions that may be used, for example, in road- or pavement-marking applications. Due to the surface and ambient conditions under which the paint is subjected, it is desirable that the paint composition meet a number of requirements. These requirements include, for example, adhesion to road surfaces, resistance to chemical attack by water and/or salt, abrasion resistance, minimal hazard involving any processing solvents, ability to adhere to or hold or retain a glass bead filler or overcoating, long-term weather resistance, ability to be applied under a wide variety of ambient temperature and road surface conditions, flowability or sprayability, good wetting action with respect to roadway surfaces, and flexibility (i.e., the ability to move as road surfaces expand or contract).

A number of materials have been proposed for road surface paint compositions. For example, U.S. Pat. No. 4,185,132 to Gurney proposes the use of co-curative materials, namely a cycloaliphatic amine and an aliphatic amine, in combination with a liquid epoxide. The above mixture is applied to the paved surface, and the mixture cures in-situ. U.S. Pat. No. 4,105,808 to McKenzie proposes a paint composition for application at elevated temperatures on traffic roadways. The composition includes a paint vehicle having a nonvolatile organic film-forming binder and a volatile solvent in which the binder is dissolved. McKenzie alleges that the above mixture forms a non-tacky paint film when applied as a thin coating and exposed to ambient temperatures. U.S. Pat. No. 4,460,625 to Emmons et al. proposes coating and impregnating compositions for applications to concrete which include several monomers, a polyvalent metal salt or complex, and an organic peroxide. U.S. Pat. No. 4,051,195 to McWhorter proposes curable compostions formed from epoxide resin/polyacrylate ester or polymethacrylate ester compositions.

Notwithstanding the above developments, these compositions often cure in a relatively slow time period. As an example, the tack free time is typically more than 60 minutes during which time the road must be blocked to apply the paint. The lengthy delay is particularly troublesome in view of the increasing traffic volume in high growth regions. Moreover, the durability of this paint is believed to be limited.

U.S. Pat. Nos. 6,437,059 and 6,485,787 to Reichhold proposes for a composition suitable for forming a paint marking on a roadway comprises a polyfunctional urethane acrylate having at least two acrylate groups, an epoxy component and a polyfunctional amine. The polyfunctional urethane acrylate reacts with the polyfunctional amine to form an adduct with secondary amine groups. The secondary amine reacts with the epoxy component to yield a chemically crosslinked material having a no track time of less than about ten minutes.

Notwithstanding the above developments, these compositions often cure in a relatively fast time period, but the no track time of about ten minutes is not curing fast enough for road blocking free application.

Thus, there is a need in the art for a paint compositions which are faster curing, exhibit greater durability and friendly application.

SUMMARY OF THE INVENTION

The present invention addresses the shortcomings alluded to above, and provides a polymeric composition for use in traffic paint exhibiting a fast cure rate as defined in greater detail hereinbelow. The composition comprises a polyfunctional acrylate component, an epoxy component, and a polyfunctional amine component. Advantageously, the polyfunctional acrylate component reacts with the polyfunctional amine component to form a secondary amine component. The formation of the secondary amine proceeds relatively quickly. The secondary amine then reacts with the epoxy component such that a chemically high crosslinked or thermoset polymeric material is formed. The composition exhibits improved properties over conventional compositions, particularly two component epoxy system, in that the composition of the invention displays improved cure speed, improved durability and application friendly.

The polymeric composition may be employed in a traffic paint composition. The traffic paint composition comprises the polymeric composition and a pigment.

BRIEF DESCRIPTION OF THE DRAWINGS

FIG. 1 illustrates a reaction scheme in accordance with the method of the invention.

DETAILED DESCRIPTION OF THE PREFERRED EMBODIMENTS

The invention will now be described in greater detail with reference to the preferred embodiments which follow. It should be appreciated, however, that these embodiments are for illustrative purposes only, and are not meant to limit the invention as defined by the claims.

As alluded to hereinabove, the invention refers to a polymeric composition that exhibits a fast cure rate. For the purposes of the invention, the term "fast cure rate" may be defined according to various measuring methods. In one instance, a fast cure rate may be defined by the term "no track time" which refers to the time necessary for the composition to cure on a road or other surface to the extent that no wheel tracks are left after the composition has been contacted by a vehicle. A preferred "no track time" is less than about 5 minutes, more preferably less than about 2 minutes, and most preferably less than or equal to about 1.5 minutes. In another instance, the term "through cure" refers to the time necessary for the composition (e.g., film) to develop hardness or integrity from a surface to a substrate. A preferred "through cure" time is less than about 8 minutes, and more preferably about 5 minutes. In yet another instance, the term "tack free time" refers to the time necessary for a composition in the form of a film to develop a hard surface. Preferably, the "tack free time" is less than about 15 minutes and is more preferably about 8 minutes.

The multi functional urethane acrylate component which is used as the polyfunctional acrylate component in the polymeric composition of the invention may be selected from those materials which are known in the art. Typically, the multi functional urethane acrylate component is a reaction product of a hydroxyl functional acrylate and an aliphatic isocyanate. Examples of hydroxyl functional acrylates include, but are not limited to, dipentaerythritolpentacrylate, ethoxylated dipentaerythritolpentacrylate, and propoxylated dipentaerythritolpentacrylate. A particularly preferred hydroxy functional acrylate is dipentaerythritolpentacrylate. Mixtures of the above may be employed.

Examples of aliphatic isocyanates that may be employed include, but are not limited to, isophoronediisocyanate, 1,1'-methylenebis(4-isocyantocyclohexane), hexamethyenediisocyanate, trimethyl-hexamethylenediisocyanate, biuret of isophoronediisocyanate, isocyanuratetrimer of isophoronediisocyanate, biuret of hexamethylenediisocyanate, isocyanuratetrimer of hexamethylenediisocycanate, prepolymers based on isophoronediisocyante and trimethylol propane, prepolymers of isophoronediisocyanate and pentaerythritol, and prepolymers of isophoronediisocyanate and hexane diol. Mixtures of the above may be employed. In general, the aliphatic isocyanate can either be a monomeric component or may be a material that is chain extended by a polyhydric alcohol that may include, but is not limited to, diols, triols, and tetraols that are known to one skilled in the art. Examples of alcohols include, but are not limited to, ethylene glycol, diethylene glycol, trimethylol propane, trimethylol ethane, pentaerythritol, ethoxylatedpentaerythritol, and propoxylatedpentaerythritol. The polyol may be in the form of a polyester polyol or a polyether polyol such as, but not limited to, polypropylene glycol or polyethylene glycol or a combination of both.

Particularly preferred aliphatic isocyanates are isophoronediisocyanate and prepolymers of isophoronediisocyanate and trimethylol propane and pentaerythritol. Mixtures of any of the above may be employed.

The multi functional urethane acrylate used in the invention preferably contains four or more acrylate functionalities, and more preferably six or more acrylate functionalities.

The multi functional acrylate component which is used as the polyfunctional acrylate component in the polymeric composition of the invention may be selected from those materials which are known in the art. Typically, the multi functional acrylate component is a reaction product of two hydroxyl functional acrylate. Examples of hydroxyl functional acrylates include, but are not limited to, dipentaerythritolpentacrylate, ethoxylated dipentaerythritolpentacrylate, and propoxylated dipentaerythritolpentacrylate. A particularly preferred hydroxy functional acrylate is dipentaerythritolpentacrylate. Mixtures of the above may be employed.

The multi functional acrylate used in the invention preferably contains four or more acrylate functionalities, and more preferably six or more acrylate functionalities.

The polymeric composition preferably comprises from about 5 to about 50 parts per weight of the polyfunctional acrylate component, and more preferably more from about 10 to about 40 parts by weight of this component. These percentages are based on the weight of the reactive components.

The epoxy component that is employed in the invention may be selected from a number of epoxy compounds that are known in the art.

For the purposes of the invention, the epoxy component may be selected from an epoxide resin, an epoxy diluent, and mixtures thereof. Preferably, the epoxy component has from about 1 to about 3 1,2-epoxy groups per molecule, and more preferably, from about 2 to about 2.5 1,2-epoxy groups per molecule.

For the purposes of the invention, an "epoxide resin" may be defined as an oligomer or polymer which contains epoxide functionality. The epoxide resin is preferably a glycidyl ether of a polyhydric phenol and polyhydric alcohol having an epoxide equivalent weight of from about 100 to about 500. Exemplary epoxide resins are the ones based on bisphenol-A and bisphenol-F, such as, but not limited to, the diglycidyl ether of bisphenol-A and the diglycidyl ether of bisphenol-F. Other epoxide resins include, but are not limited to, the diglycidyl ether of tetrabromobisphenol A, epoxy novolacs based on phenol-formaldehyde condensates, epoxy novolacs based on phenol-cresol condensates, epoxy novolacs based on phenol-dicyclopentadiene condensates, diglycidyl ether of hydrogenated bisphenol A, diglycidyl ether of resorcinol, tetraglycidyl ether of sorbitol, and tetra glycidyl ether of methylene dianiline. Mixtures of any of the above may be employed.

An "epoxy diluent" may be defined as an epoxy-containing monomeric component which is capable of reducing the viscosity of a composition. Examples of epoxy diluents include, but are not limited to, glycidyl ethers of the following alcohols: 2-ethylhexanol, $C_8$-$C_{10}$ alcohol, $C_{12}$-$C_{14}$ alcohol, cresol, p-tertiary butyl phenol, nonyl phenol, phenol, neopentyl glycol, 1,4-butanediol, cyclohexane dimethanol. propylene glycol, dibromoneopentyl glycol, trimethylol propane, trimethylol ethane, and n-butanol. Other diluents which do not contain epoxy functionality may be employed and include, for example, benzyl alcohol, and nonyl phenol. Diluents with acrylate functionality can be employed and include tripropylene glycol diacrylate, hexane dioldiacrylate, and trimethylol propane triacrylate.

Diluents with carbonate functionality may also be used and include ethylene and propylene carbonate. Preferably, the epoxy diluent has 1 1,2-epoxy group per molecule. Mixtures of any of the above can be used.

The polymeric composition may comprise various amounts of the epoxy component. Preferably, the composition comprises from about 10 to about 60 weight percent of the epoxy component, and more preferably from about 20 to about 50 weight percent. These amounts are based on the total weight of reactive components.

As set forth herein, the polymeric composition of the invention comprises a polyfunctional amine component. The polyfunctional amine preferably is an aliphatic amine. The polyfunctional amine preferably has at least two amine groups per molecule. Exemplary polyfunctional amines include, but are not limited to, diethylenetriamine, ethylene diamine, triethylenetetramine, tetraethylenepentamine, hexamethylenediamine, 1,2-diaminocyclohexane, amino ethyl piperazine, and the like. Mixtures of any of the above may be employed. Preferably, the polyfunctional amine is used in the polymeric composition an amount from about 10 to about 50 weight percent, and more preferably from about 20 to about 35 weight percent. These weight percentages are based on the total weight of reactive components.

In accordance with the invention, the polyfunctional amine may be used in the form of an adducted amine. The adducted amine may be prepared in accordance with procedures that are known in the art. Typically, the amine adduct is formed by reacting an excess of polyfunctional amine with an epoxy resin. An example of an amine adduct is set forth in U.S. Pat. Nos. 4,185,132 and 4,088,633 to Gurney; and U.S. Pat. No. 5,385,684 to Gutierrez et al, the disclosures of which are incorporated herein by reference in their entirety. In numerous instances, it may be preferable to employ the amine adducts. For example, the amine adducts may display a lower volatility relative to the unmodified polyfunctional amines thereby making them potentially safer to handle. Adduction may also be used to increase the amine hydrogen equivalent weight of the polyfunctional amine so that a practical mixing ratio of the components is possible, for example 2 parts of a component A (i.e., a polyfunctional urethane acrylate and an epoxy component) to 1 part of a component B (i.e., a polyfunctional amine) by volume. Moreover, adduction may improve the compatibility of the polyfunctional amine with the polyfunctional acrylate and epoxy component that potentially results in films with improved appearance.

The composition of the invention may also encompass other components that are conventionally employed in polymerizable systems. These components include, but are not limited to, accelerators, promoters, and the like. Examples of accelerators that may be used in the composition include, for example, nonyl phenol, t-butyl phenol, bisphenol A, benzyl alcohol, salicyclic acid, lactic acid, p-toluene sulfonic acid, and the like, along with mixtures of the above.

The polymeric composition of the invention is typically utilized in conjunction with a paint composition, although other uses are contemplated within the scope of the invention. The paint composition may employ those components, additives, and the like which are known to the skilled artisan. Examples of materials that are typically employed in traffic paint compositions are set forth in U.S. Pat. No. 4,105,808 to McKenzie, the disclosure of which is incorporated herein by reference in its entirety. In particular, the paint composition comprises pigments such that the paint is visible after being applied to the pavement. Typically, while or yellow pigment is employed in the composition, preferably in an amount ranging from about 15 to about 25 parts based on the weight of the composition.

In another aspect, the invention relates to a method of forming a paint marking on a roadway. The method comprises applying a traffic paint composition comprising the polymeric composition as defined herein to the surface of a roadway. The method is advantageous in that it may be used utilizing existing equipment under ambient conditions.

A preferred method for carrying out the invention is as follows. Preferably, the composition of the invention is present as a two-component composition in which polyfunctionalacrylate and epoxy component is part of Component A and the polyfunctional amine is part of Component B. Components A and B are applied, typically sprayed, to a substrate by employing conventional application equipment such as, for example, a plural component sprayer. Typically, Components A and B are mixed immediately prior to being applied. Subsequent to application to the substrate, the mixed composition of Components A and B rapidly cures generally according to the reaction scheme set forth in FIG. 1.

The foregoing examples are presented to illustrate the invention and are not intended to limit the scope of the invention as defined by the claims. All amounts listed in the examples are by weight, unless otherwise specified. The following list of resin components will be referred to in the examples: Resin A is diglycidyl ether of bisphenol A which is commercially available from Dow Chemical of Midland, Mich. as DER331. Resin A has an average molecular weight of 370 and an average epoxy equivalent weight of 187. Resin B is a decafunctional acrylate resin. Resin B is commercially available from Ruike Chemical of Zhejiang, China. as 3DA-80. Resin C a decafunctional urethane acrylate resin. Resin Cis commercially available from Ruike Chemical of Zhejiang, China. as UADEC-90. Resin D is a low molecular weight xylene formaldehyde resin, which is commercially available as Epodil LV5 from Air Products& Chemicals Inc of Allentown, Pa. Resin E is an epoxy diluent, which is the glycidyl ether of C12-C14 alcohol. Resin E is commercially available from Reichhold Inc. of Research Triangle Park, N.C. as EPOTUF® 37-058. Resin F is a acrylate oligomer which is trimethol propane triacrylate and is commercially available from UCB Radcure of Smyrna, Ga. as TMPTA-N. Pigment A is titanium dioxide pigment, which is commercially available from Dupont of Wilmington, Del. as Ti-Pure® 902.

EXAMPLE 1

A pigment base was prepared by high-speed dispersing 50 parts of Pigment A in 50 parts of Resin A for 30 minutes until a Hegman Grind of 7 was obtained.

EXAMPLE 2

Component A of a fast curing traffic paint was prepared by blending 52 parts of pigment base from Example 1, 26 parts of Resin B, 22 parts of Resin A. The cure speed and durability properties of the cured films based on Example 6 are set forth in Table 1.

EXAMPLE 3

Component A of a fast curing traffic paint was prepared by blending 52 parts of pigment base from Example 1, 26 parts of Resin C, 17 parts of Resin A, 5 parts of Resin E. The cure speed and durability properties of the cured films based on Example 6 are set forth in Table 1.

EXAMPLE 4

Component A of a fast curing traffic paint was prepared by blending 52 parts of pigment base from Example 1, 30 parts of Resin C, 18 parts of Resin A. The cure speed and durability properties of the cured films based on Example 6 are set forth in Table 1.

EXAMPLE 5

Component A of standard epoxy traffic paint was prepared by blending 40 parts of pigment base from Example 1, 44 parts of Resin A, and 16 parts of Resin F. The comparative cure speed and durability properties of the cured films based on Example 6 are set forth in Table 1.

EXAMPLE 6

A polyfunctional amine adduct was prepared according to the following procedure. Into a 1 liter reaction flask equipped with stirring, temperature control, and nitrogen inert gas was charged 179.9 grams of diethylenetriamine was charged to reactor, no heat, start agitator, charge 30.8 grams of Resin D, and 384.3 grams of nonylphenol. 105 grams of resin A was charged while holding temperature at 70-90 degree. C. After addition is complete, hold for 30 minute sat 70 degree. C., and sample for final constants. The final composition had a calculated amine hydrogen equivalent weight of 86 and a viscosity of 55 stokes at 25.degree. C.

EXAMPLE 7

A plural component road-striping machine applied the paint compositions described in examples 4 and 6. The two components were heated to 120-130.degree. F. and spray applied to a road surface using a 2:1 mix ratio and a top dressing of retroreflective glass beads. A no track time test was run by driving an automobile over the stripe after the stripe was applied. The stripe passed the no track test after 2 minutes curing time. A standard epoxy stripe required approximately 6 minutes of curing time to pass the no track test.

TABLE 1

| Samples | Epoxy control | Polyacrylate | Polyacrylate | Polyacrylate |
|---|---|---|---|---|
| Part A | Example 5 | Example 2 | Example 3 | Example 4 |
| Part B | Example 6 | Example 6 | Example 6 | Example 6 |
| Mix Ratio, by Volume | 2A to 1B | 2A to 1B | 2A to 1B | 2A to 1B |
| Curing speed minutes | | | | |
| Gel time | 6 | 2 | 2 | 1:30 |
| No track Time without glass beads | 30 | 4 | 4 | 3 |
| Through dry time | 59 | 7 | 6 | 5 |
| Tack Free time | 63 | 10 | 9 | 8 |
| Taber abrasion, mg lost after 1000 cycles | 85 | 71 | 69 | 67 |
| Flexibility ¼" | Fail | pass | pass | pass |
| Shore D hardness | 80 | 82 | 80 | 82 |
| Accelerated | 5 | 4 | 3 | 3 |

TABLE 1-continued

| Samples | Epoxy control | Polyacrylate | Polyacrylate | Polyacrylate |
|---|---|---|---|---|
| werthering QUV initial Yellowness Index | | | | |
| 500 hour Yellowness Index | 35 | 18 | 15 | 9 |

Disclosed herein are typical preferred embodiments of the invention and, although specific terms are employed, they are used in a generic and descriptive sense only and not for purposes of limitation of the scope of the invention as defined by the claims.

That which is claimed:

1. A polymeric composition exhibiting a fast cure rate, said composition consisting essentially of: a polyfunctional acrylate component; wherein the polyfunctional acrylate is a condensation reaction product of two hydroxyl functional (multi) acrylates; wherein the hydroxy functional (multi) acrylates is selected from the group consisting of dipentaerythritol pentacrylate, ethoxylated dipentaerythritol pentacrylate, propoxylated dipentaerythritol pentacrylate, and mixtures thereof;
an epoxy resin component;
and from about 20 to about 35 percent by weight of a polyfunctional amine component; wherein the polyfunctional amine component comprises at least one primary amine group;
wherein said polyfunctional acrylate component and said polyfunctional amine component have sufficient functionalities such that said polyfunctional acrylate component reacts with said polyfunctional amine component to form a secondary amine component, and wherein said secondary amine reacts with said epoxy resin component such that a chemically high crosslinked polymeric material is formed, and wherein said polymeric composition has a no track time of less than about 5 minutes.

2. The composition according to claim 1, wherein the hydroxy functional (multi) acrylates is dipentaerythritol pentacrylate.

3. The composition according to claim 1, wherein the polyfunctional amine component contains at least two amine groups per molecule.

4. The composition according to claim 1, wherein the polyfunctional amine component is selected from the group consisting of diethylenetriamine, ethylene diamine, hexamethylenediamine, triethylenetetramine, tetraethylenepentamine, aminoethylpiperazine, and mixtures thereof.

5. The composition according to claim 1, wherein said composition further consisting essentially of an epoxy diluent.

6. The composition according to claim 1, wherein the epoxy component contains more than one 1,2-epoxy resin groups per molecule.

7. The composition according to claim 1, wherein said composition further consisting essentially of an accelerator.

8. A traffic paint composition consisting essentially of the polymeric composition defined in claim 1 and at least one pigment.

9. The polymeric composition according to claim 1, wherein the epoxy resin component is selected from the group consisting of resins based on diglycidyl ether of bisphenol-A, resins based on diglycidyl ether of bisphenol-F, diglycidyl ether of tetrabromobisphenol A, epoxy novolacs based on phenol-formaldehyde condensates, epoxy novolacs based on phenol-cresol condensates, epoxy novolacs based on phenol-dicyclopentadiene condensates, diglycidyl ether of hydrogenated bisphenol A, digylcidyl ether of resorcinol, tetraglycidyl ether of sorbitol, tetra glycidyl ether of methylene dianiline, and mixtures thereof.

10. The polymeric composition according to claim 1, wherein the epoxy resin component is selected from the group consisting of glycidyl ethers of 2-ethylhexanol, glycidyl ethers of $C_8$-$C_{10}$ alcohol, glycidyl ethers of $C_{12}$-$C_{14}$ alcohol, glycidyl ethers of cresol, glycidyl ethers of p-tertiary butyl phenol, glycidyl ethers of nonyl phenol, glycidyl ethers of phenol, glycidyl ethers of neopentyl glycol, glycidyl ethers of 1,4-butanediol, glycidyl ethers of cyclohexane dimethanol, glycidyl ethers of propylene glycol, glycidyl ethers of dibromoneopentyl glycol, glycidyl ethers of trimethylol propane, glycidyl ethers of trimethylol ethane, glycidyl ethers of n-butanol, and mixtures thereof.

11. A polymeric composition exhibiting a fast cure rate, said composition consisting essentially of a decfunctional acrylate component formed from the condensation reaction product of two dipentaerythritolpentacrylate(s); an epoxy resin component; and from about 20 to about 35 percent by weight of a polyfunctional amine component; wherein the polyfunctional amine component comprises at least one primary amine group; wherein said decfunctional acrylate component and said polyfunctional amine component have sufficient functionalities such that said decfunctional acrylate component reacts with said polyfunctional amine component to form a secondary amine component, and wherein said secondary amine reacts with said epoxy resin component such that a chemically high crosslinked polymeric material is formed, and wherein said polymeric composition has a no track time of less than about 5 minutes.

* * * * *